United States Patent
Onde

(10) Patent No.: US 11,086,622 B2
(45) Date of Patent: Aug. 10, 2021

(54) METHOD FOR MANAGING AN UPDATE OF A MICROCODE WITHIN A PROCESSING UNIT

(71) Applicant: STMicroelectronics (Rousset) SAS, Rousset (FR)

(72) Inventor: Vincent Onde, Fuveau (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/886,245

(22) Filed: May 28, 2020

(65) Prior Publication Data

US 2020/0293314 A1 Sep. 17, 2020

Related U.S. Application Data

(63) Continuation of application No. 15/607,615, filed on May 29, 2017, now Pat. No. 10,705,838.

(30) Foreign Application Priority Data

Oct. 4, 2016 (FR) ...................................... 1659550

(51) Int. Cl.
*G06F 9/44* (2018.01)
*G06F 9/24* (2006.01)
(Continued)

(52) U.S. Cl.
CPC ................ *G06F 9/24* (2013.01); *G06F 8/654* (2018.02); *G06F 8/656* (2018.02);
(Continued)

(58) Field of Classification Search
CPC . G06F 9/24; G06F 8/656; G06F 8/654; G06F 13/1668; G06F 13/38; G06F 21/572
(Continued)

(56) References Cited

U.S. PATENT DOCUMENTS 4,484,275 A   11/1984 Katzman et al.
5,056,015 A * 10/1991 Baldwin ................... G06F 9/24
                                              703/27
(Continued)

FOREIGN PATENT DOCUMENTS

EP         3073372 A1    9/2016

OTHER PUBLICATIONS

Title: A software infrastructure for firmware-software interaction: The case of TPMs , author: A Magro, et al, published on 2017.*

(Continued)

*Primary Examiner* — Chameli Das
(74) *Attorney, Agent, or Firm* — Slater Matsil, LLP

(57) ABSTRACT

Microcode is stored in a program memory and intended to be executed by a central processing unit of a processing unit. The processing unit may include a memory controller associated with each program memory and a hardware peripheral. The method includes, in response to a request to update the microcode, a transmission, to each hardware peripheral, of a global authorization request signal obtained from an elementary authorization request signal generated by each corresponding memory controller, a transmission of a global authorization signal obtained from an elementary authorization signal generated by each hardware peripheral in response to the global authorization request signal and after satisfying a predetermined elementary condition, and an updating of each microcode by the corresponding memory controller only after the global authorization signal is received.

20 Claims, 4 Drawing Sheets

(51) Int. Cl.
*G06F 8/654* (2018.01)
*G06F 8/656* (2018.01)
*G06F 21/57* (2013.01)
*G06F 13/16* (2006.01)
*G06F 13/38* (2006.01)
*G06F 8/65* (2018.01)

(52) U.S. Cl.
CPC .......... *G06F 13/1668* (2013.01); *G06F 13/38* (2013.01); *G06F 21/572* (2013.01); *G06F 8/65* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 5,634,108 A * | 5/1997 | Freeman | ............ | G06F 12/0875 711/118 |
| 5,778,070 A * | 7/1998 | Mattison | ............ | G06F 12/1408 711/E12.092 |
| 9,307,067 B2 | 4/2016 | Debates et al. | | |
| 2006/0179128 A1* | 8/2006 | Haulin | ............ | H04W 8/245 709/220 |
| 2008/0228993 A1* | 9/2008 | Lin | ............ | H04B 1/7156 711/100 |
| 2009/0240891 A1* | 9/2009 | Strait | ............ | G06F 12/126 711/129 |
| 2012/0151263 A1* | 6/2012 | Rentschler | ............ | G06F 11/22 714/30 |
| 2012/0255018 A1 | 10/2012 | Sallam | | |
| 2013/0159986 A1 | 6/2013 | Tsao et al. | | |
| 2013/0185548 A1 | 7/2013 | Djabarov et al. | | |
| 2013/0268922 A1* | 10/2013 | Tiwari | ............ | G06F 9/4411 717/168 |
| 2014/0122847 A1* | 5/2014 | Henry | ............ | G06F 9/4403 712/243 |
| 2014/0195727 A1* | 7/2014 | Xu | ............ | G06F 13/1668 711/103 |
| 2016/0036956 A1* | 2/2016 | Debates | ............ | G06F 16/951 455/419 |
| 2016/0203426 A1 | 7/2016 | Hankins et al. | | |
| 2016/0323197 A1 | 11/2016 | Guzman et al. | | |
| 2016/0371099 A1 | 12/2016 | Woog et al. | | |
| 2017/0134164 A1 | 5/2017 | Haga et al. | | |
| 2017/0168725 A1* | 6/2017 | Tamura | ............ | G06F 3/0619 |
| 2017/0255451 A1 | 9/2017 | Son et al. | | |
| 2017/0286086 A1* | 10/2017 | Narasimhan | ............ | G06F 8/654 |
| 2021/0026637 A1* | 1/2021 | Vorbach | ............ | G06F 9/30043 |

OTHER PUBLICATIONS

Title: Global Trigger Upgrade firmware architecture for the level-1 Trigger of the CMS experiment, author: B Rahbaran et al, published on 2015.*

Title: Upgrade of the level 1 global trigger system in the Belle experiment, author E Won et al, published on 2008.*

"16-Bit Digital Signal Controllers for Digital Power Applications with Interconnected High-Speed PWM, ADC, PGA and Comparators," Microchip Technology Inc., dsPIC33EPXXGS50X Family, Oct. 2015, 390 pages.

"UCD3138064A Highly Integrated Digital Controller for Isolated Power," Texas Instruments, SLUSCA5, Dec. 2015, 88 pages.

* cited by examiner

METHOD FOR MANAGING AN UPDATE OF A MICROCODE WITHIN A PROCESSING UNIT

CROSS-REFERENCE TO RELATED APPLICATIONS

This application is a continuation of U.S. application Ser. No. 15/607,615, filed on May 29, 2017, which claims the priority benefit of French patent application number 1659550 filed on Oct. 4, 2016, both of which applications are hereby incorporated herein by reference.

TECHNICAL FIELD

Embodiments provide a method for managing an update of at least one microcode within a processing unit, for example a microcontroller and corresponding processing unit.

BACKGROUND

Generally, microcontrollers are configured to be capable of updating the microcodes and programming the hardware peripherals, with possible periods of interruption to operation of the microcontroller, commonly known to the person skilled in the art as "downtime."

To update a microcode in such a microcontroller, at the present time it is generally necessary either to proceed with a reboot of the microcontroller at the end of the update, or to proceed with an interruption to possible hardware peripheral programming during the microcode update, thereby in any case introducing additional downtime of the microcontroller.

Reprogramming of hardware peripherals of the microcontroller at the end of the update, without a reboot of the microcontroller, can be achieved through software but creates a permanent increase in the operational load of the microcontroller and a considerably increased real-time latency.

Moreover, such reprogramming additionally increases the complexity of the software as well as the downtime of the microcontroller.

SUMMARY

Implementations and embodiments relate to processing units, notably microcontrollers. For example, but in a non-limiting manner, implementations relate to microcontrollers for digital switch-mode power supplies, driven by microcodes, commonly known to the person skilled in the art as "firmware", controlled by corresponding microcode controllers, and containing hardware peripherals such as high-resolution timers or direct memory access controllers, known to the person skilled in the art by the acronyms "hrtimer" and "DMA controller" respectively, and more particularly the updating of these microcodes.

Thus, according to one implementation and embodiment, it is proposed to provide a low-cost and low-complexity technical approach to make updates of microcodes and of hardware peripheral programming in a microcontroller coherent, so as to reduce, or even eliminate, microcontroller downtime.

According to one aspect, a method can be used for managing the update of at least one microcode stored in at least one program memory and intended to be executed by at least one central processing unit of a processing unit. The processing unit may include a memory controller associated with each program memory, and at least one hardware peripheral.

The update of a microcode is understood here as being an on-the-fly update, as distinguished from an uploading of the microcode itself, which is generally a background task executed by the processing unit together with the execution of its main task.

The method may comprise, in response to at least one request to update each microcode, a transmission, to each hardware peripheral, of a global authorization request signal obtained from an elementary authorization request signal generated by each corresponding memory controller. The method may also comprise a transmission of a global authorization signal obtained from at least one elementary authorization signal generated by the of the hardware peripherals in response to the global authorization request signal and after satisfying a predetermined elementary condition within the of the hardware peripherals. Each microcode can be updated by the corresponding memory controller only after the global authorization signal is received.

According to variant embodiments, there can notably be provided within the processing unit a single central processing unit, a single memory controller and a single peripheral, or a single central processing unit, a single memory controller and several peripherals, or several central processing units, several memory controllers and several peripherals.

When only one memory controller is provided, the global authorization request signal is the elementary authorization request signal generated by the memory controller.

When only one peripheral is provided, the global authorization signal is the elementary authorization signal generated by the peripheral.

However, when several memory controllers are provided, the global authorization request signal can be obtained from elementary authorization request signals generated by the various memory controllers.

Similarly, when several peripherals are provided, the global authorization signal can be obtained from elementary authorization signals generated by the various peripherals or possibly by one or some of them according to a selection of these peripherals.

By such a method, the microcode or microcodes can be updated only when the peripheral(s) selected have satisfied a predetermined condition within them, for example, when they are ready to execute an operation. Otherwise, the microcode update is not performed and reception of the global authorization signal (typically an acknowledgement signal) is awaited, generated by the peripheral or peripherals selected and which indicates that the peripheral or peripherals are all ready to execute their respective operations, i.e., they each satisfy their predetermined condition.

By such a method, the update of the microcode and the execution of at least one operation of at least one hardware peripheral can advantageously be made coherent, in a transparent manner.

In other words, the update of the microcode does not cause any interruption to the execution of an operation of the hardware peripheral.

The on-the-fly update of the microcode also does not cause any interruption to the execution of the central processing unit. The associated memory controller provides for changing from one version of the software to another without having to reset or reboot the central processing unit.

This operational transparency advantageously provides for updates of mixed levels of abstraction of the microcontroller, in this case high-level updates of microcodes and low-level updates of peripherals.

The request to update a microcode can be external, for example, an external signal or a signal arising from the operation of a pushbutton, or more generally internal, for example, a control signal generated by each associated central processing unit following an upload and a check of the corresponding new microcode.

As indicated previously, according to one implementation, satisfying the predetermined elementary condition comprises the triggering of the execution by the of the hardware peripherals of at least one operation following reception by the peripheral of a request to execute this operation.

Satisfying the predetermined elementary condition can additionally comprise, before the execution of the operation is triggered, a preloading of at least one corresponding control register of the peripheral following the reception of the request to execute this operation, the triggering being activated at the moment of a next triggering edge of at least one update event signal of the peripheral.

According to one implementation, the generation of the elementary authorization request signal by the of the memory controllers is also conditional upon the reception by the of the memory controllers of an elementary interrupt request signal generated, in response to an external request to update an interrupt table, by a vectored interrupt controller coupled to the of the memory controllers.

According to another aspect, there is proposed a processing unit, for example a microcontroller, comprising at least one program memory, at least one central processing unit intended to execute at least one microcode stored in the program memory, and a memory controller associated with each program memory, each memory controller being configured to generate, in response to at least one request to update the associated microcode, an elementary authorization request signal. The processing unit may also include at least one hardware peripheral, and a first signal generator configured to generate a global authorization request signal from each elementary authorization request signal and to transmit the global authorization request signal to each hardware peripheral. The hardware peripheral may be configured to generate, in response to the global authorization request signal and after satisfying a predetermined elementary condition within the hardware peripheral, an elementary authorization signal. The processing unit may also include a second signal generator configured to generate a global authorization signal from the elementary authorization signal and to transmit the global authorization signal to each memory controller. Each memory controller additionally may be configured to update the corresponding microcode only after the global authorization signal is received.

According to one embodiment, the peripheral is configured to trigger the execution of at least one operation after having received a request to execute this operation so as to satisfy the predetermined elementary condition within this peripheral.

According to one embodiment, the peripheral is additionally configured to preload, before triggering the execution of the operation, at least one control register of this peripheral following the reception of the request to execute this operation, and to trigger the execution of the operation upon the occurrence of the next triggering edge of at least one update event signal of the peripheral.

According to one embodiment, the processing unit additionally comprises an interrupt controller associated with each memory controller and configured to transmit, in response to an external request to update an interrupt table, an elementary interrupt request signal to the associated memory controller. The associated memory controller may be configured to generate the elementary authorization request signal in response to the request to update the associated microcode and in response to the corresponding elementary interrupt request signal.

According to one embodiment, the memory controller and the hardware peripheral are secure, and the global authorization request signal and the global authorization signal are also secure.

According to another aspect, there is proposed an electronic system, such as a digital switch-mode power supply, including at least one processing unit as defined above.

According to yet another aspect, there is proposed an electronic apparatus such as a cellular portable telephone, a tablet or a portable computer, comprising at least one system as defined above.

BRIEF DESCRIPTION OF THE DRAWINGS

Other advantages and features of the invention will become clearer upon examining the detailed description of implementations and embodiments, which are not at all limiting, and accompanying drawings in which.

DETAILED DESCRIPTION OF ILLUSTRATIVE EMBODIMENTS

Figure 1:
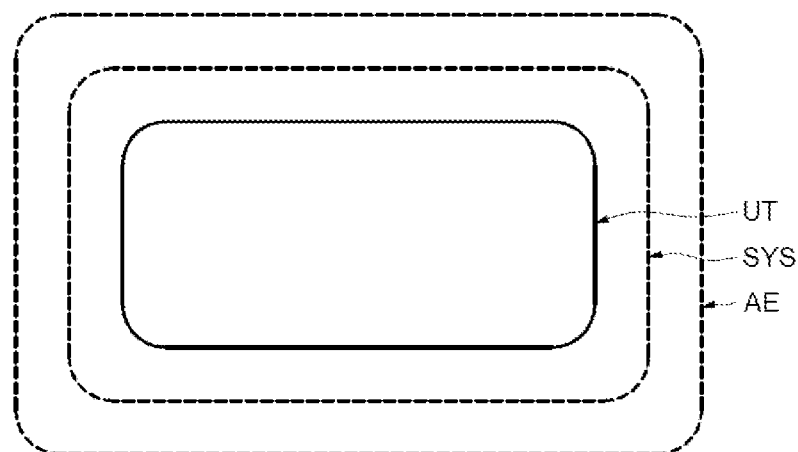
FIG. 1 is a schematic block diagram of an electronic apparatus in accordance with the invention.

In FIG. 1, the reference AE denotes an electronic apparatus AE such as a portable computer, a tablet or a cellular mobile telephone, these examples not being limiting, comprising an electronic system SYS, in this case, for example, a digital switch-mode power supply suitable for accurately and reliably converting an input supply voltage to one or more internal supply voltages that can be used by various modules of the electronic system SYS.

The system SYS additionally includes at least one processing unit UT, such as a microcontroller or a microprocessor.

Figure 2:
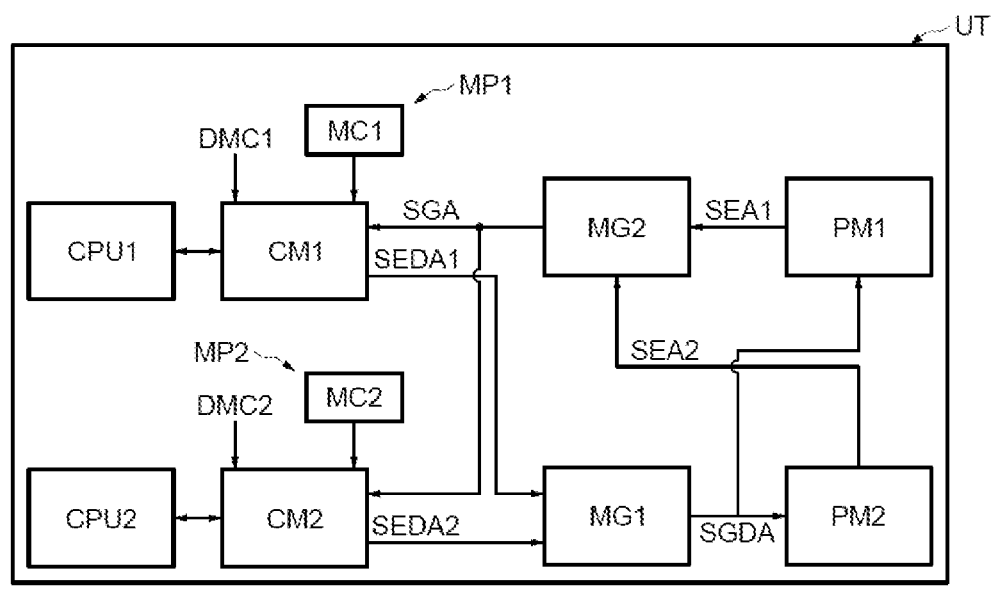
FIG. 2 is a schematic block diagram of the processing unit as shown in FIG. 1.

FIG. 2 schematically illustrates an example of a processing unit UT incorporated in the electronic system SYS. The processing unit UT comprises at least one program memory, in this case for example two flash type program memories MP1 and MP2 intended to store two corresponding microcodes MC1 and MC2, respectively. At least one central processing unit, commonly known to the person skilled in the art by the acronym "CPU", can be implemented, in this case for example with two central processing units CPU1 and CPU2 intended to execute the microcodes, MC1, MC2 respectively. A memory controller CM1, CM2 is associated with each program memory MP1, MP2 and is intended to update the microcode MC1, MC2. Each memory controller CM1, CM2 is also configured to generate, in response to at least one request DMC1, DMC2 to update the associated microcode MC1, MC2, an elementary authorization request signal SEDA1, SEDA2.

The processing unit also comprises at least one hardware peripheral, in this case for example two hardware peripherals PM1 and PM2, such as a high-resolution timer (hrtimer), a safety timer, a pulse width modulation (PWM) clock, a DMA controller, a security peripheral, or a power domain of the microcontroller. A first signal generator (e.g., generating means) MG1 is intended to transmit to each hardware peripheral a global authorization request signal SGDA obtained from each elementary authorization request signal SEDA1, SEDA2, each peripheral then being configured to generate, in response to the global authorization request signal SGDA and after satisfying a predetermined elementary condition, an elementary authorization signal SEA1, SEA2. The satisfying of this predetermined elementary condition can, for example, be the triggering of the execution of an operation (programming) by the peripheral.

As is clear from above, each of the elements can include one or more of the element. In this context it is understood that, for example, the terms "at least one central processing unit" and "central processing unit" are synonymous. A CPU can include one or more CPU circuits. The same applies to each of the other elements.

The processing unit also includes a second signal generator MG2 intended to transmit to each memory controller CM1, CM2 a global authorization signal SGA obtained from each elementary authorization signal SEA1, SEA2.

The update of each microcode MC1, MC2 by the corresponding memory controller CM1, CM2 is then carried out only after the global authorization signal SGA is received.

Figure 3:
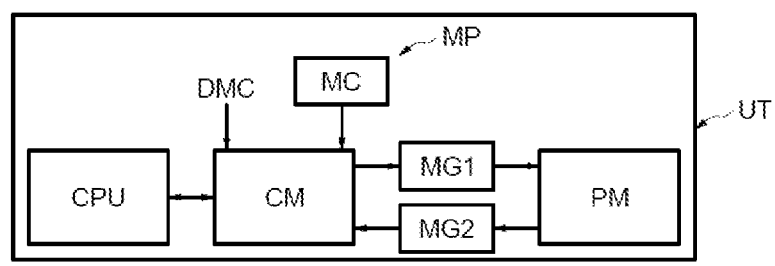
FIG. 3 is a schematic block diagram of another embodiment of a processing unit as may be used in the apparatus of FIG. 1.

Reference is first made to FIG. 3 to illustrate very schematically an embodiment of a processing unit UT including only one central processing unit CPU and only one hardware peripheral PM. The processing unit UT includes a program memory MP intended to store a microcode MC, a memory controller CM coupled to the program memory MP and to the hardware peripheral PM and the first and second signal generators MG1 and MG2.

This being so, since in this embodiment there is only one memory controller CM and only one hardware peripheral PM in this processing unit UT, the first and second signal generators MG1 and MG2 then amount to simple connection lines. Thus, the global authorization request signal SGDA is hence the elementary authorization request signal SEDA generated by the memory controller CM and the global authorization signal SGA is hence the elementary authorization signal SEA generated by the hardware peripheral.

When an update of the microcode MC is requested, for example, by a user, a microcode update request signal DMC is generated, generally through software, and is delivered to the memory controller CM.

Figure 4:
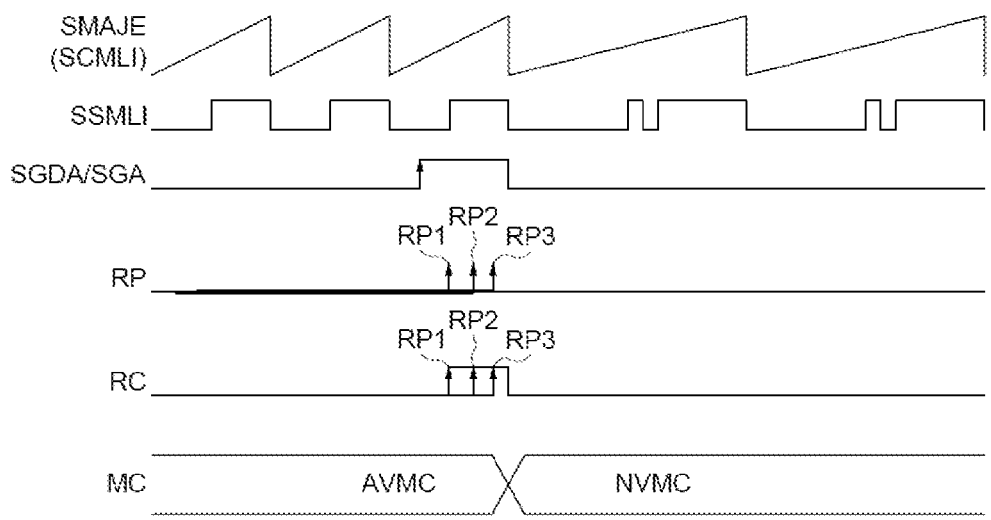
FIG. 4 is a timing diagram of various signals in the processing unit in accordance with the invention.

Reference is now simultaneously made to FIG. 4 to illustrate an example of a method for managing the update of the microcode MC in the processing unit UT as illustrated in FIG. 3.

The memory controller CM is configured to deliver to the hardware peripheral PM the global authorization request signal SGDA upon reception of the microcode update request signal DMC. The signal SGDA is a logic signal which in this case is considered to be active (i.e. effectively representative of an authorization request) when it takes the logic value 1.

The hardware peripheral PM is configured to maintain the global authorization request signal SGDA at the high state (logic value 1) while awaiting the arrival of at least one operation request (or programming request) RP1, RP2, RP3 of the hardware peripheral PM, generated through software, or through hardware, for example, by a DMA controller intended to transfer new programming from a random access memory (RAM) to the hardware peripheral PM. An operation request indicates to the hardware peripheral that it will have to execute the operation.

The hardware peripheral PM is additionally configured to prepare the execution of the corresponding operation or operations and to deliver to the memory controller CM the global authorization signal SGA at the end of the preparation of this execution, i.e., when the hardware peripheral is ready to execute the operation or operations. The authorization signal SGA is considered in this case as transmitted on the falling edge of the signal SGDA, i.e., when this logic signal takes the value 0 (low state).

More specifically, in this example, the preparation of the execution of an operation request RPi carried out by the hardware peripheral PM includes a preloading of a control register RCi of the hardware peripheral PM, associated with the operation request RPi.

The execution of the operation RPi will be triggered during the next triggering edge of an update event signal SMAJE of the processing unit UT.

At the moment when this execution is triggered, the predetermined elementary condition is considered to be satisfied and the peripheral PM is then configured to take into account the content of the corresponding preloaded control register RCi and to deliver to the memory controller CM the global authorization signal SGA.

If the hardware peripheral PM receives several operation requests RP1, RP2, RP3, for example, in the case of a DMA controller, all the corresponding control registers RC1, RC2 and RC3 are preloaded in the order of arrival of the requests.

It is appropriate to note that the next triggering edge of the update event signal SMAJE always arrives later than the programming request RPi because the update event signal SMAJE is generated as a function of the operation request RPi. By way of example, there can be a mechanism for counting the number of requests so as to trigger the update of the hardware peripheral PM after a certain number of requests, or more simply to trigger the update event signal SMAJE by an end-of-DMA-transfer signal.

The memory controller CM is additionally configured to update the microcode MC stored in the program memory MP upon reception of the global authorization signal SGA.

In other words, as illustrated in the bottom part of FIG. 4, upon reception of the global authorization signal SGA, the new microcode version NVMC is taken into account by the memory controller CM in order to replace the previous version AVMC of this microcode.

In the application described here, the processing unit UT is additionally configured to update, during the update of the microcode MC, at least one pulse width modulation output signal SSMLI and at least one pulse width modulation counter signal SCMLI, as illustrated in FIG. 4.

Since the update of the microcode MC does not involve any interruption to the programming of the hardware peripheral PM nor a reboot of the processing unit, the method for managing the update of the microcode MC described above can advantageously be used to reduce, or even remove, operational downtime of the processing unit UT while offering the possibility of performing mixed updates, i.e., updates of firmware and drivers of hardware peripherals.

Figure 5:
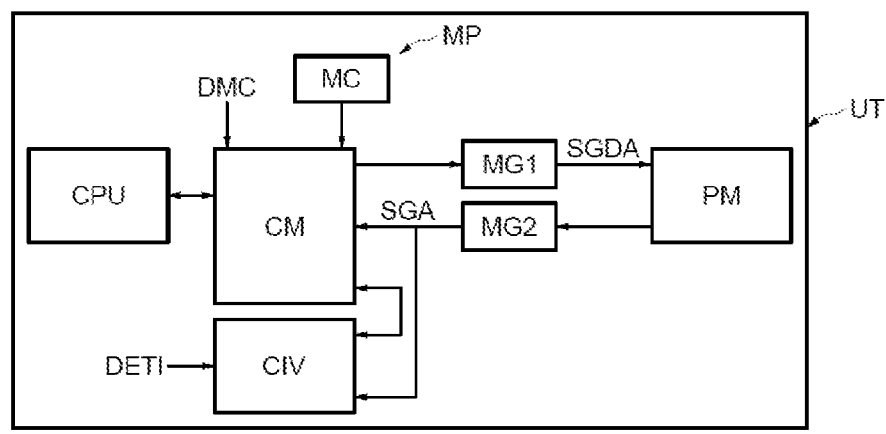
FIG. 5 is a schematic block diagram of yet another embodiment of the processing unit as may be used in the apparatus of FIG. 1.

FIG. 5 illustrates a possible variant of the microcontroller illustrated in FIG. 3.

In this embodiment, the microcontroller UT additionally comprises a vectored interrupt controller CIV coupled to the memory controller CM and providing for managing interrupts when external events occur.

The vectored interrupt controller CIV is also intended to receive an external interrupt table update request signal DETI generated through software by a user, as well as the global authorization signal SGA delivered by the hardware peripheral PM.

Moreover, the vectored interrupt controller CIV and the memory controller CM are jointly configured to form an interlock mechanism. Thus, the memory controller CM is configured to deliver the global/elementary authorization request signal only when the two update request signals DMC and DETI are generated and activated together by a user.

The vectored interrupt controller CIV is additionally configured to update the base address of a corresponding interrupt table upon reception of the global authorization signal, together with the updating of the microcode by the memory controller (FIG. 4).

Figure 6:
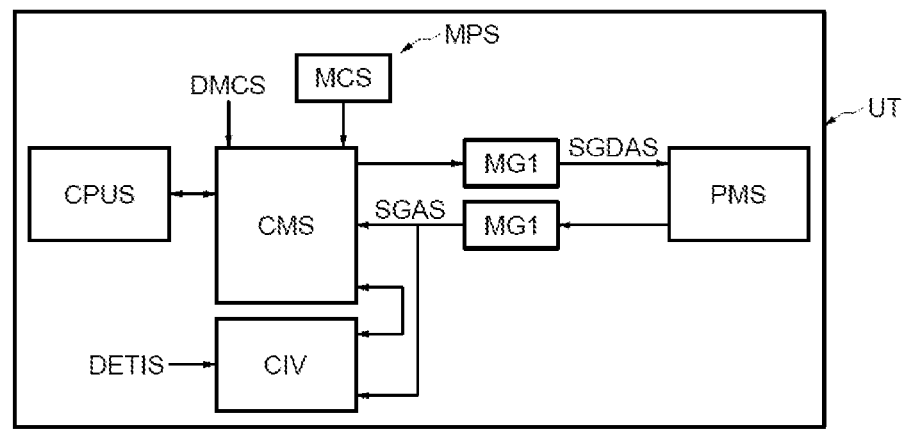
FIG. 6 is a still another embodiment of the processing unit as may be used in the apparatus of FIG. 1.

According to another possible variant illustrated in FIG. 6, the central processing unit is a secure central processing unit CPUS, the memory controller CM can be a secure memory controller CMS, and the hardware peripheral PM can be a secure hardware peripheral PMS.

The microcode is then a secure microcode MCS and the various signals DMC, SGDA, SGA, DETI mentioned above become corresponding secure signals DMCS, SGDAS, SGAS, DETIS.

The various steps of the method for managing the update of a secure microcode in this variant (FIG. 6) are similar to those described previously with reference to FIG. 4 and are therefore not described here again for reasons of simplification.

Figure 7:
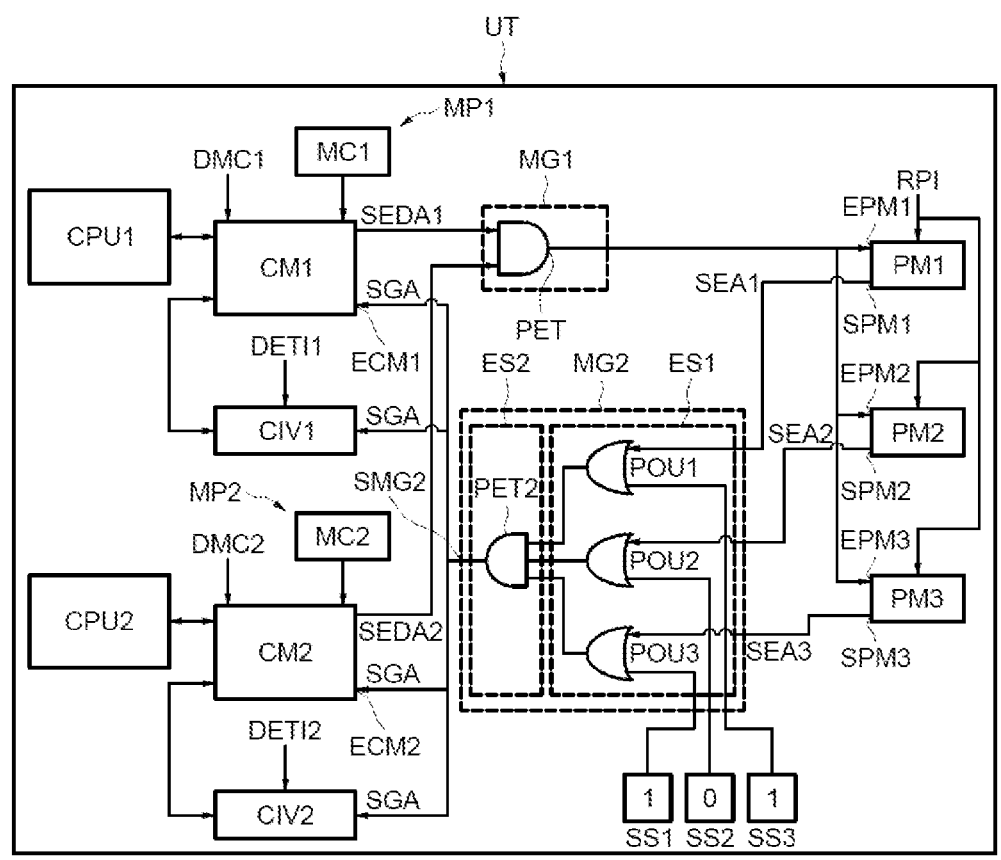
FIG. 7 is another embodiment of the processing unit as may be used in the apparatus of FIG. 1.

Another possible variant is schematically illustrated in FIG. 7.

The processing unit UT according to this variant includes several central processing units, in this case, for example, two central processing units CPU1 and CPU2, two corresponding memory controllers CM1 and CM2, two corresponding vectored interrupt controllers CIV1 and CIV2, and several hardware peripherals, in this case, for example, three peripherals PM1, PM2, PM3. All these items can be secure or non-secure.

The first signal generator MG1 is coupled between outputs of the corresponding memory controllers CM1 and CM2 and inputs EPM1, EPM2, EPM3 of the three hardware peripherals PM1 to PM3.

Each memory controller CM1 or CM2 delivers the corresponding elementary authorization request signal SEDA1, SEDA2 to the first signal generator MG1. The first signal generator MG1 is configured to generate as an output the global authorization request signal SGDA and to transmit this global authorization request signal SGDA to the inputs EPM1 to EPM3 of the three hardware peripherals PM1 to PM3.

The first signal generator MG1 is configured to place the global authorization request signal SGDA at the high state when each elementary authorization request signal SEDA1, SEDA2 is at the high state, i.e., when each memory controller CM1 or CM2 considers updating the corresponding microcode.

By way of example, the first signal generator MG1 includes in this case an AND logic gate, referenced PET, which receives the elementary authorization request signals SEDA1 and SEDA2 delivered by the two memory controllers CM1 and CM2 respectively and which delivers as output the signal SGDA.

The second signal generator MG2 is coupled between outputs SPM1 to SPM3 of the three hardware peripherals PM1 to PM3 and inputs ECM1 and ECM2 of the memory controllers CM1 and CM2.

Each hardware peripheral PM1 to PM3 delivers to the second signal generator MG2 the corresponding elementary authorization signal SEA1 to SEA3 once the predetermined elementary condition is satisfied.

The second signal generator MG2 generates the global authorization signal SGA at output SMG2 and delivers this global authorization signal SGA to the inputs ECM1 and ECM2 of the memory controllers CM1 and CM2.

The second signal generator MG2 may comprise in this case, for example a first selection stage ES1 including three OR logic gates, referenced POU1 to POU3. The first input of the OR gate POUi receiving the corresponding elementary authorization signal SEAi and the second input receiving a corresponding selection signal SSi. The second signal generator MG2 may also include a second selection stage ES2 simply including a second logic gate PET2 of the AND type.

The corresponding selection signals SS1 to SS3 are used to select the hardware peripheral or peripherals to take into account for updating the microcodes MC1 and MC2 of the processing unit UT.

In the case illustrated in FIG. 7, the first and third selection signals SS1 and SS3 are in the high state and only the second selection signal SS2 is in the low state. Consequently, the programming of the corresponding hardware peripherals PM1 and PM3 are ignored and have no impact on the updating of the microcodes. Specifically, even if the elementary authorization signals SEA1 and SEA3 are in the low state and therefore active, the outputs of the corresponding OR gates are at 1. Consequently, it is the elementary authorization signal SEA2 which, according to its state 0 or 1, will or will not make the output of the AND gate PET2 switch to state 0.

In other words, in this example, the microcodes MC1 and MC2 are updated upon reception of the second elementary authorization signal SEA2 (low state of the logic signal) delivered by the second hardware peripheral PM2, which will make the global authorization signal SGA switch to the low state.

Of course, it would indeed be possible to select two or more than two hardware peripherals being able to determine the updating of the microcodes of the microcontroller MC.

Figure 8:
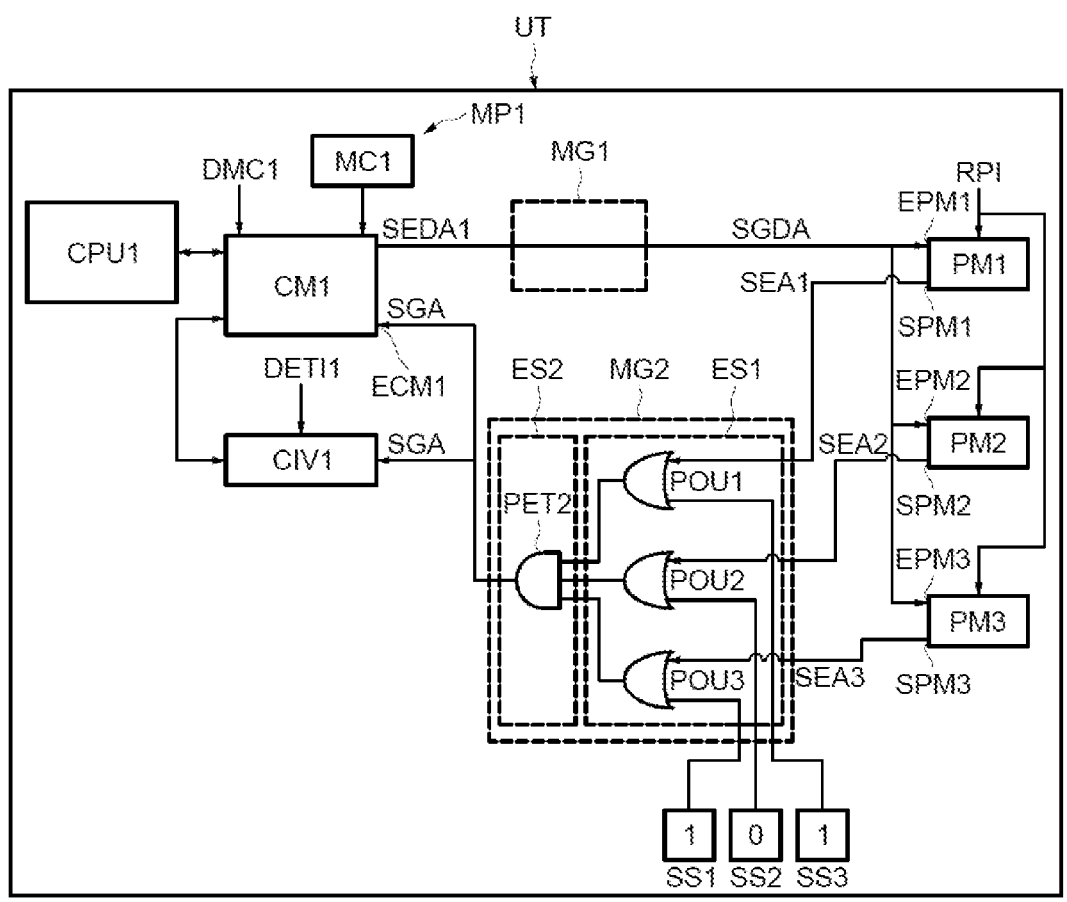
FIG. 8 is a still another embodiment as may be used in the apparatus of FIG. 1.

FIG. 8 illustrates a simplified variant of the processing unit UT illustrated in FIG. 7.

This processing unit UT illustrated in FIG. 8 includes only one central processing unit CPU1 and several hardware peripherals. The first signal generator MG1 is therefore formed merely by a transmission line. Consequently, the elementary authorization request signal SEDA1 delivered by the memory controller CM1 is also the global authorization request signal SGDA.

The remainder of this processing unit UT illustrated in FIG. 8 is identical to that illustrated in FIG. 7.

Thus according to the implementations and embodiments, a processing unit is obtained that is capable of executing, on the fly, hardware peripheral operations during an update of one or more microcodes, thereby reducing the downtime of the processing unit and transparently maintaining the coherence between hardware peripherals and microcodes of the processing unit.

What is claimed is:

1. A method comprising:
having a microcode stored in a program memory, the microcode to be executed by a processor of a device, the device comprising a memory controller coupled to the program memory and a hardware peripheral;
preloading, by the hardware peripheral, a control register of the hardware peripheral in response to receiving a microcode update request;
generating, by the hardware peripheral, a global authorization signal in accordance with triggering an execution of an operation by the processor after preloading the control register, the global authorization signal triggering an update by the memory controller of the microcode in response to receiving the global authorization signal from the hardware peripheral.

2. The method of claim 1, wherein the processor remains powered on during the updating of the microcode.

3. The method of claim 1, wherein receiving the microcode update request comprises:
generating a microcode update request signal through software by a user; and
delivering the microcode update request signal to the memory controller.

4. The method of claim 1, further comprising generating, by the memory controller, a global authorization request signal upon reception of an interrupt request signal, the interruption request signal generated in response to an external request to update an interrupt table by a vectored interrupt controller coupled to the memory controller.

5. The method of claim 1, further comprising generating, by the memory controller, a global authorization request signal in response to receiving, by the memory controller, the microcode update request, and wherein the generating the global authorization signal is further in accordance with receiving, by the hardware peripheral, the global authorization request signal from the memory controller.

6. The method of claim 1, wherein the triggering is activated at a moment of a next triggering edge of an update event signal of the hardware peripheral.

7. The method of claim 1, wherein the global authorization signal is a secure signal and the microcode is a secure microcode.

8. An electronic apparatus comprising:
a program memory;
a processor in communication with the program memory, the processor configured to execute a microcode stored in the program memory;
a hardware peripheral comprising a control register, the hardware peripheral configured to:
preload the control register in response to receiving a microcode update request, and
generate a global authorization signal in accordance with triggering an execution of an operation by the processor after preloading the control register; and
a memory controller associated with the program memory and configured to update the microcode in response to receiving the global authorization signal.

9. The electronic apparatus of claim 8, further comprising an interrupt controller associated with the memory controller and configured to transmit an interrupt request signal to the memory controller in response to an external request to update an interrupt table.

10. The electronic apparatus of claim 9, wherein the memory controller is further configured to generate a global authorization request signal in response to receiving the microcode update request by the memory controller, and wherein the generate the global authorization signal is further in accordance with receiving, by the hardware peripheral, the global authorization request signal from the memory controller.

11. The electronic apparatus of claim 8, wherein each of the memory controller and the hardware peripheral is a secure device and the global authorization signal is a secure signal.

12. The electronic apparatus of claim 8, wherein the electronic apparatus comprises a plurality of program memories and a plurality of processors, each of the plurality of processors configured to execute microcode stored in each of the program memories.

13. The electronic apparatus of claim 8, wherein the triggering is activated at a moment of a next triggering edge of an update event signal of the hardware peripheral.

14. The electronic apparatus of claim 8, wherein receiving the microcode update request comprises:
generating a microcode update request signal through software by a user; and
delivering the microcode update request signal to the memory controller.

15. An electronic apparatus comprising:
a plurality of program memories;
a plurality of processors, each processor configured to execute microcode stored in each of the program memories;
a plurality of hardware peripherals, wherein each hardware peripheral is accessible by a respective processor, each of the plurality of processors, the hardware peripheral comprising an associated control register, each hardware peripheral configured to:
reload the associated control register in response to receiving a respective microcode update request for a respective processor, and
generate a respective global authorization signal in accordance with triggering an execution of an operation by the respective processor after preloading the associated control; and
a plurality of memory controllers, each memory controller associated with an associated program memory and configured to update a respective microcode in response to receiving the respective global authorization signal.

16. The electronic apparatus of claim 15, further comprising an interrupt controller associated with a first memory controller and configured to transmit an interrupt request signal to the first memory controller in response to an external request to update an interrupt table.

17. The electronic apparatus according to claim 15, wherein each of the memory controllers and each of the hardware peripherals is a secure device and each generated global authorization signal is a secure signal.

18. The electronic apparatus of claim 15, wherein receiving the respective microcode update request comprises:
generating a respective microcode update request signal through software by a user; and
delivering the respective microcode update request signal to a corresponding memory controller.

19. The electronic apparatus of claim 15, wherein each memory controller is further configured to generate a respective global authorization request signal in response to receiving the respective microcode update request, and wherein the generate the respective global authorization signal is further in accordance with receiving, by a respective hardware peripheral, a respective global authorization request signal.

20. The electronic apparatus of claim 15, wherein the triggering is in accordance with a next triggering edge of an update event signal of a respective hardware peripheral.

\* \* \* \* \*